Dec. 25, 1934.  A. W. SMITH  1,985,554

PHOTOGRAPHIC DEVELOPING APPARATUS

Filed June 21, 1932    5 Sheets—Sheet 1

INVENTOR
Arthur W. Smith
BY Harold E. Stonebraker
ATTORNEY

Dec. 25, 1934.  A. W. SMITH  1,985,554
PHOTOGRAPHIC DEVELOPING APPARATUS
Filed June 21, 1932  5 Sheets-Sheet 2

INVENTOR
Arthur W. Smith
BY
Harold E. Stonebraker,
ATTORNEY

Dec. 25, 1934.  A. W. SMITH  1,985,554
PHOTOGRAPHIC DEVELOPING APPARATUS
Filed June 21, 1932   5 Sheets—Sheet 3

INVENTOR
Arthur W. Smith
BY Harold E. Stonebraker
ATTORNEY

Dec. 25, 1934.  A. W. SMITH  1,985,554
PHOTOGRAPHIC DEVELOPING APPARATUS
Filed June 21, 1932  5 Sheets-Sheet 5

INVENTOR
Arthur W. Smith
BY
Harold E. Stonebraker,
ATTORNEY

Patented Dec. 25, 1934

1,985,554

UNITED STATES PATENT OFFICE 1,985,554

PHOTOGRAPHIC DEVELOPING APPARATUS

Arthur W. Smith, Rochester, N. Y.

Application June 21, 1932, Serial No. 618,497

26 Claims. (Cl. 95—89)

This invention relates to improvements in photographic developing apparatus, and has for its principal object the provision of an apparatus of this kind which is simple in construction, automatic in operation, and which eliminates the possibility of accidental exposure of the predeveloped films, or films to unsafe light which might result in fogging them. The present invention is particularly useful where a large number of plates or films are exposed, as in photographic studios and doctors' and dentists' offices where large numbers of X-ray exposures are made.

Another object of the invention is the provision of an apparatus of this kind in which four baths are provided, the first being for the developer, the second a wash bath of pure water, the third a fixing bath, and the fourth a final wash bath of water, and mechanical means for transferring the films or plates successively from one bath to the next, and timing means for controlling the operation of said mechanical means.

Still another object of the invention is the provision of an apparatus of this kind with automatically operated means for creating a draft of air for quickly drying the films when removed from the final wash water.

A further object of the invention is the provision of a suitable electric timing apparatus for controlling the time intervals between successive operations.

To these and other ends, the invention consists in the construction and arrangement of parts that will appear from the following description when read in conjunction with the accompanying drawings, the novel features being pointed out in the claims at the end of the specification.

Referring particularly to the drawings, the apparatus illustrated comprises a suitable light-tight cabinet in which are arranged four tanks or baths adjacent each other. The films or plates to be developed are mounted on a suitable carrier and inserted in the first or developing tank. The carrier is operated by an electric motor of the reversible kind and controlled by a suitable timing device. At the expiration of the given interval of time required for the developing operation, the timing device operates to close a circuit to start the motor which moves the carrier to transfer the films from the developing bath and through the first wash to the fixing bath, when the circuit is automatically broken to stop the motor. Again after the given interval of time required for fixing the films has elapsed, the motor is operated to move the carrier to transfer the film from the fixing bath to the final wash tank, when the circuit is again automatically broken to stop the motor, and when the washing is complete, the timing device again operates to actuate the motor to move the carrier to withdraw the films therefrom, when the circuit is again automatically broken to stop the motor, and at the same time a fan is set in operation to cause a draft for drying the films, the timing device being operative to stop the fan after a predetermined interval of time. One or more pilot lights may be employed for indicating the progress taking place within the light-tight cabinet.

Referring to the drawings, 1 is a light-tight cabinet preferably painted interiorly with a flat black paint to avoid light reflections. A shelf or support 2 is arranged horizontally in the casing on which the tanks 3, 4, 5 and 6 for the various baths are supported. A drain board 7 is also arranged adjacent the tank 6. An inclosed chamber 8 may be provided adjacent the tank 3 and separated therefrom by means of a partition 9. Arranged in the chamber 8 is a suitable electric light 11 arranged to illuminate the chamber 12 in which the baths above referred to are arranged. The partition 9 is provided with an opening over which a suitable ruby transparency 13 is arranged to render the light entering the chamber 12 nonactinic. The chamber 8 may be provided with a suitable closure 14 and the chamber 12 by a suitable closure 15 for convenience in giving access thereto.

Arranged in the rear of the tanks is a vertical wall or support 16, at the top of which is a horizontally arranged support 17 extending between the wall 16 and the rear wall of the casing. Said support 17 is provided with an elongated opening 18 through which the upper end of a carrier 19 projects. The support 2 is similarly slotted to form an opening for the carrier. At its upper end, the carrier has an arm 21 which projects forwardly therefrom over one or another of the open tops of the tanks 3, 4, 5 or 6. Suspended on the arm 21 is a film rack 22 provided with a plurality of suitable spring clips whereby a plurality of films or plates 23 may be attached thereto. At its lower end, the carrier is pivoted to a slide 24 movable in vertically arranged guideways 25 mounted on the rear side of the wall 16. The upper end of the carrier 19 has a bearing against a bar 26 which is slidably mounted on a pair of posts 27 and movable rearwardly thereon against the tension of springs 28 coiled on said posts. Secured to or formed integral with one side of the slide 24 is a rack 31 which meshes with a spur gear 32 fixed on a shaft 33 revolubly mounted in the casing. Also fixed on the shaft 33 is a pulley 34 which is operatively connected with a pulley 35 fixed on the shaft of an electric motor 36 by any suitable means, such as a flexible belt 37 as shown. The motor 36 is of the reversible type and when driven in one direction raises the slide 24 and with it the carrier 19; when the motor is driven in the reverse direction, the slide and with it the carrier is moved downwardly or depressed.

Means are provided for automatically reversing the direction of the motor when the slide reaches the limit of its upward movement. To this end, a reversing switch 38 is mounted in the casing and has a movable member 39 projecting into the path of and between a pair of lugs 41 and 42 projecting laterally from the slide 24. When operating the device, the exposed films or plates are arranged on the carrier which is moved manually to the position shown in Figs. 2 and 3, with the films in the developing bath 3 and the slide 24 in depressed position and its lug 41 in engagement with the arm 39 of the reversing switch and the timing device is set in operation. At the end of the time interval determined to be required to complete the developing operation, the timing device operates to set the motor in operation to raise the slide and carrier to lift the films out of the developer bath. Resilient means, comprising a spring 43 anchored to the casing at one end and connected with the upper end of the carrier by means of a flexible cord 44 arranged over an idler 45, tends to swing the carrier toward the baths 4, 5 and 6. A follower in the form of a pin or lug 46 projecting forwardly from the carrier engages a vertically arranged guide 47 and retains the carrier against the tension of its spring and guides its movement in a substantially vertical plane when it moves to raise the films from the developer. When the slide 24 reaches the upper limit of its movement, the pin 46 moves off the upper end of the guide 47 and the spring 43 operates to swing the carrier to the left or to the right, as seen from the rear in Fig. 2, to a position over the rinsing bath 4, when the pin moves from engagement with the guide 47 and into engagement with a horizontally arranged cam guide 48 for directing the carrier downwardly when it reaches a point over the rinse bath 4. At this same time, when the slide 24 reaches the limit of its upward movement, the lug 42 operates the arm 39 to reverse the motor to depress the carrier and the films are immersed in the rinse bath 4. When the carrier moves downwardly, its pin 46 engages a second vertically arranged guide 49 which retains it against the action of the spring 43 and limits its movement to a substantially vertical plane.

When the slide 24 reaches the limit of its movement in a downward direction, the lug 41 again operates the reversing switch 38 to reverse the motor and the carrier is again elevated to immediately lift the films from the rinsing bath. When the end of its upward path is reached, the pin 46 moves off the vertical guide 49 into engagement with the guide 48, which again directs the carrier downwardly when its spring 43 moves it laterally, and the pin 46 moves into engagement with a third vertical guideway 50. At the same time, the lug 42 operates the reversing switch and changes the direction of the motor to move the carrier downwardly and with it the films into the fixing bath 5.

Figure 1:
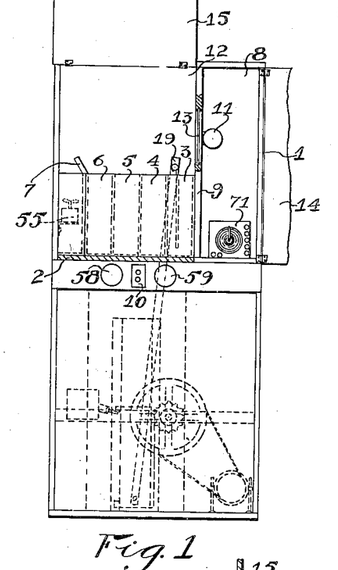
Fig. 1 is a front elevation of a photographic developing and fixing apparatus illustrating one possible embodiment of the invention, the closures for the openings in the front wall of the casing being open to expose the interior.
Figure 2:
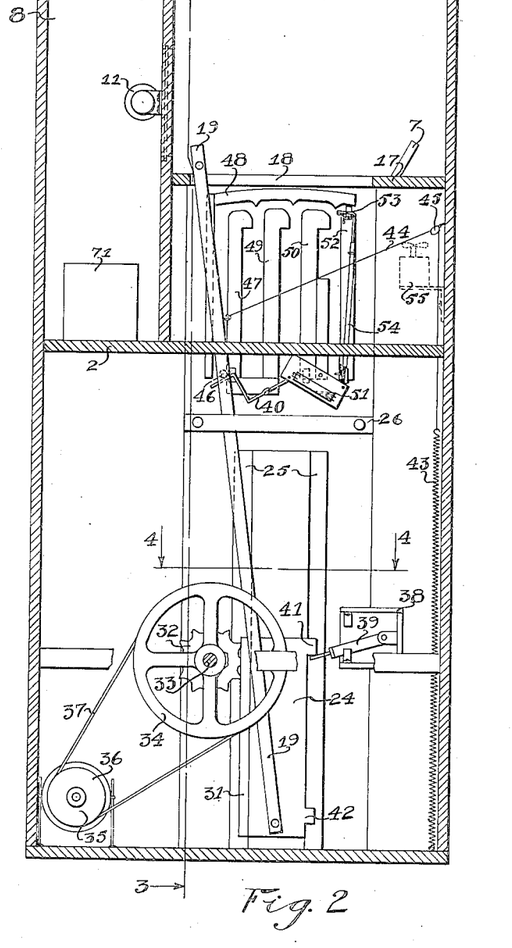
Fig. 2 is a rear elevation of the same drawn on an enlarged scale, the rear wall of the casing being sectioned away to expose the interior.
Figure 3:
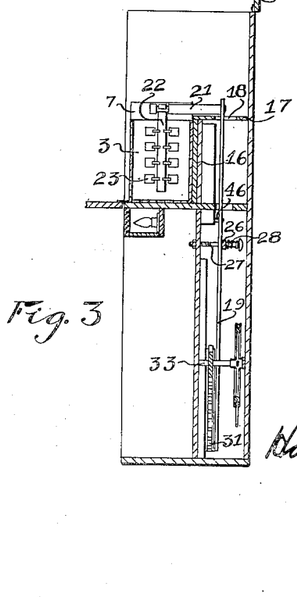
Fig. 3 is a sectional view taken substantially on line 3—3 of Fig. 2 looking in the direction of the arrow at said line and drawn on a somewhat reduced scale.
Figure 4:
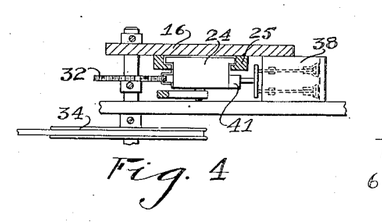
Fig. 4 is a section taken substantially on line 4—4 of Fig. 2, looking in the direction of the arrow at said line.
Figure 5:
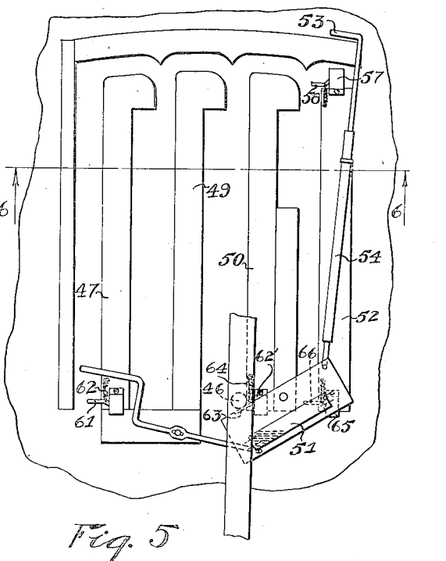
Fig. 5 is an enlarged fragmentary view of a guideway for a carrier.
Figure 6:
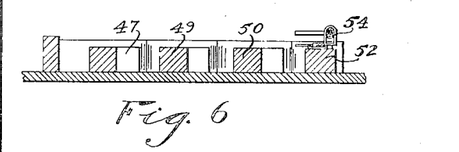
Fig. 6 is a sectional view taken substantially on line 6—6 of Fig. 5 and looking in the direction of the arrow at said line.
Figure 7:
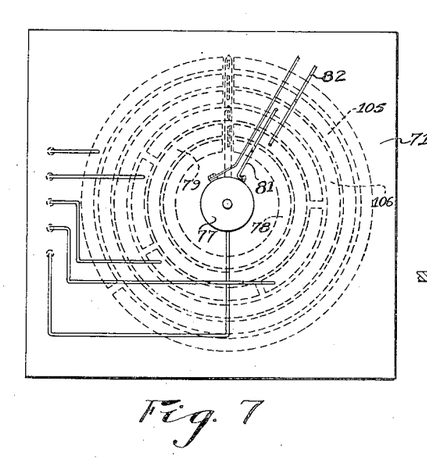
Fig. 7 is an inverted plan view of the timing device for controlling the movements of the carrier.

Since a considerable interval of time is required for fixing the films, usually ten minutes or longer, it is desirable to stop the operation of the motor when it has moved the carrier to insert them in the fixing bath. To this end, a mercury switch 51 is pivoted intermediate its ends in the casing and arranged in the circuit of the motor. One of its free ends is arranged adjacent the lower end of the guide 50 in the path of the pin 46 on the carrier. When the switch is in the position shown in Fig. 2, the circuit through the motor is closed through its right hand or depressed end and when the carrier is moved to insert the films in the fixing bath, its pin 46 engages its left hand end, as seen in said figure, and swings it on its pivot to break said circuit and stop the motor. In order to insure that the mercury switch is properly positioned to close the circuit through its right end, as seen in Fig. 2, when the films are inserted in the developing bath, its left end is engaged by one end of a lever 40 pivoted on a fixed part, the other end of which is arranged in the path of the pin 46 adjacent the lower end of the guide 47. When the carrier is depressed to insert the films in the developing bath, the pin 46 engages the lever 40 and swings the lever in a direction to swing the mercury switch to the position shown in said Fig. 2, in which the circuit through the motor is closed through its right hand end.

When the films have been in the fixing bath the required interval of time, the timing device operates to close a circuit to the motor through the left hand end of the mercury switch. Operation of the motor raises the slide 24 and with it the carrier to lift the films from the fixing bath, and at the limit of the upward movement the pin 46 moves off the guide 50 into engagement with the guide 48 which directs it downwardly toward the open upper end of the wash bath 6. At the same time, the lug 42 operates the reversing switch to reverse the motor to depress the carrier and insert the films in the wash bath, during which time the pin 46 on the carrier engages a fourth vertical guide 52. It is also desirable to keep the films in the wash bath during a considerable interval of time, the circuit through the left end of the mercury switch being broken to stop the motor. By reference to Fig. 2 of the drawings, it will be noted that the free right end of the switch is arranged adjacent the lower end of the guide 52 so that when the carrier has moved to insert the films in the wash bath, the pin 46 engages it and swings it back to the position shown in Fig. 2 and breaks the circuit through its left end.

When the films have been in the wash bath the required interval of time, the timing device again operates to close the circuit through the motor which operates to raise the carrier to lift the films from the wash bath. When the carrier reaches the limit of its upward movement, it moves into engagement with the guide 48, which again directs it to the right, but since the developing, fixing, and washing operations are complete, the only remaining operation is to dry the film. To this end, means are provided for stopping the motor when the carrier reaches a position in which the films are suspended over the drain board 7, which serves as a drip catcher. When the pin 46 passes from the guide 52, it engages a hook 53 on the upper end of a member 54 slidably mounted on the guide 52. The lower end of the member 54 is pivotally connected with the mercury switch 51 so that when the pin 46 engages the hook 53 and raises the slide 54, it swings the switch from the position shown in Fig. 2 to a substantially horizontal position and breaks the circuit through the motor and stops the carrier with the films suspended over the drain board 7, where they are held during the drying operation.

An electric fan 55 is arranged to fan the films or blow a draft of air over them to hasten the drying operation. The fan 55 is an electric fan arranged in series with the secondary coil of a transformer 56, as clearly indicated in the wiring diagrams, said circuit being also controlled by the timing device which, as will hereinafter appear, closes the secondary circuit at the time when the films are in drying position and breaks it after a suitable interval of time. The primary coil of the transformer 56 is arranged in series with a suitable source of electric energy and is controlled by a toggle switch 57 normally held open by resilient means such as a spring and arranged at the upper end of the guide 52, and having an arm 58' projecting into the path of the pin 46 to be operated thereby to close the switch and start the fan when the pin reaches the upper end of the guide 52. When the drying is complete or when the fan has been in operation for a predetermined interval of time, the timing device again operates to open the circuit through the secondary coil and stop the fan.

A pair of pilot lamps 58 and 59, which may be of distinct colors such as red and green, may be arranged in any suitable or convenient position in the front of the casing to be visible from without the casing. As is well known, the exposed films are sensitive to actinic or white light while in the developing bath and until after they reach the fixing bath. While in the developing bath, therefore, the red lamp 58 may be kept burning to indicate that the cabinet must be kept closed unless in a dark room, and when the films reach the fixing bath, the fact is indicated by extinguishing the red lamp 58 and burning the green lamp 59. By this arrangement, the attendant may know at a glance when development is complete and that the films may be safely examined in white light, if necessary. The lamps 58 and 59 are separately controlled by suitable switches in circuit therewith. The lamp 58 is controlled by a toggle switch 61 arranged in the path of the pin 46 adjacent the lower end of the guide 47, and resiliently held in open position by means of the spring 62. When the carrier is depressed in contact with the guide 47 to immerse the films in the developing bath, the pin engages the arm 61 and closes the switch to close the circuit through the lamp 58. The switch is held closed by the pin until the carrier is raised to lift the films from the developing bath when the arm 61 is again released and the spring operates to open the switch and the lamp 58 is again extinguished.

A similar toggle switch 62' in the circuit of the green lamp 59 projects from the lower end of the guide 50 into the path of the pin 46. The switch 62' is resiliently held open by means of a spring 64. When the carrier moves to immerse the films in the fixing bath, its pin 46 engages the arm 63 and moves it to close the switch and holds it closed until the fixing operation is complete, and the carrier moves to raise the films from the fixing bath when its pin 46 moves from the arm 63 and the spring operates to again open the switch. During the time that the switch is closed, the green light 59 is energized and indicates to the attendant that the developing operation is complete and that the films may now be exposed to white or actinic light without danger of injury. There is a second toggle switch 65 in the circuit of the green lamp 59 having an arm 66 projecting into the path of the pin 46 from the lower end of the guide 52. When the carrier moves to immerse the films in the wash bath 6, the pin 46 engages the arm 66 and closes said switch and holds it closed during the washing operation or until the carrier is again raised to move its pin 46 from the arm 66 to permit its spring to return it to open position. While the switch 65 is closed or the films are in the bath 6, the green lamp is again energized to indicate that the films may be examined in white light with safety. When the films are removed from the wash bath, the arm 66 is returned to its normal position under the action of its spring.

The timing device and wiring are illustrated in Figs. 7 to 18 of the drawings and will now be described. The timing device generally referred to by the reference numeral 71 comprises a second hand or arm 72 and a minute hand or arm 73 arranged on concentric shafts to revolve about a common axis. The shaft 74 for the arm 72 in the illustrated embodiment is arranged within the hollow shaft 75 for the arm 73. The shafts 74 and 75 project upwardly through a centrally arranged opening in a contact support 76 from electrical clockwork 77 of usual or ordinary construction. The second hand 72 is driven at an angular velocity sixty times greater than the minute hand 73, that is, the hand 72 is driven at a speed to make sixty complete revolutions while the hand 73 makes one complete revolution. The arms or hands 72 and 73 move in planes substantially parallel with each other and with the surface of the contact support 76, though separated from each other and from the surface of said support. Mounted on the support are a plurality of arcuate contacts concentric with the axis of the arms 72 and 73, and insulated from each other by the support which may be constructed of any suitable non-conducting material. The two inner contacts 78 and 79 are substantially continuous throughout the entire path of movement of the arms 72 and 73, except that their ends are separated from each other at the starting point of said arms to form a gap between them which is greater than the arc through which the minute hand moves while the second hand moves through a complete revolution, so that the second hand always overtakes the minute hand while the latter is passing said gap.

Figure 9:
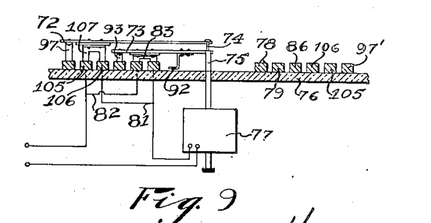
Fig. 9 is a vertical section of the same taken on line 9—9 of Fig. 8 and looking in the direction of the arrow.
Figure 10:
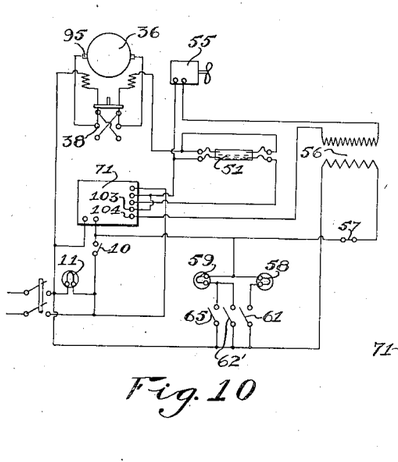
Fig. 10 is a wiring diagram of the electrical devices, showing the parts in positions corresponding to the Fig. 8 position of the timing device.
Figure 11:
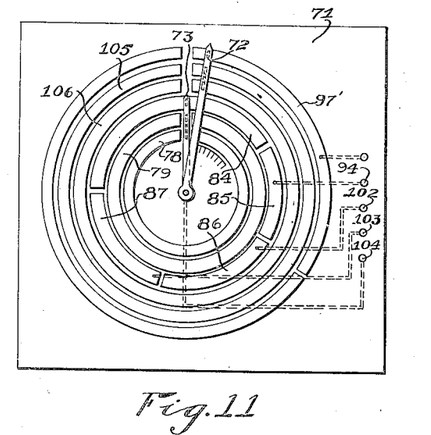
Fig. 11 is a view similar to Fig. 8 showing the timing device just after the developing operation has been started.
Figure 12:
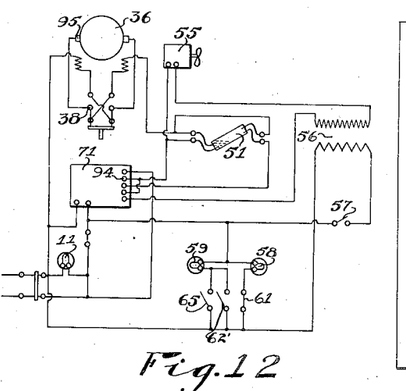
Fig. 12 is a view similar to Fig. 10 showing a position of the parts corresponding to the Fig. 11 position of the timer.

Referring to Fig. 9 of the drawings, it will be noted that the contact 78 is connected with one of the terminals of the electric clockwork 77 by means of a conductor 81 and the contact 79 with one of the terminals of a source of electric energy by a conductor 82, so that a contact 83 mounted on and insulated from the arm 73 and arranged to simultaneously engage both contacts closes a circuit through the clockwork to the other terminal of said source of electric energy.

Arranged in the same circle adjacent to but separated from the contact 79 are a plurality of contacts 84, 85, 86 and 87. The contact 84 has an arcuate length of substantially one-sixth of the complete revolution traversed by the minute hand from the zero or starting point which represents a time interval of substantially ten minutes. This contact has no electrical connections and is therefore substantially "dead", and is arranged to be traversed by the minute hand while the films are in the developing bath, and by the arrangement shown limits the maximum time interval to a period of ten minutes. Said interval can be reduced by manually setting the minute hand ahead so that the remaining part of the contact to be traversed is less than ten minutes. For convenience in setting the minute hand for an interval less than ten minutes, a scale 91 graduated in minutes may be provided on the support 76 with which a pointer 92 on the minute hand cooperates.

Figure 13:
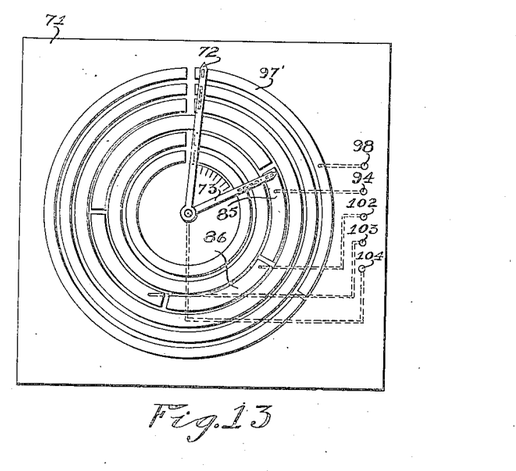
Fig. 13 is a view similar to Fig. 8 showing the timing device at the time when rinsing or first washing operation takes place, when the developing operation is complete and the films are transferred to the fixing bath.
Figure 14:
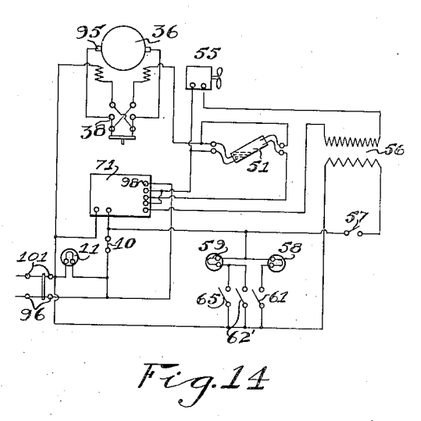
Fig. 14 is a view similar to Fig. 10 showing a position of the parts corresponding to the Fig. 13 position of the timing device.

At the expiration of the time interval required for the films in the developing bath, the contact 93 on the minute hand moves into engagement with the contact 85 to close the circuit, as shown in Figs. 13 and 14 through the motor 36 to start the motor to carry the films from the developing bath through the rinse bath to the fixing bath, as previously explained. The contact 85 is connected with the terminal 94 of the timing device which is connected with one of the terminals of the motor through the left hand end of the mercury switch 51 and the reversing switch 38. The hand 73 is connected with the terminal 96 of a source of electric energy through the second hand 72 when the contact 97 mounted on said hand engages the arcuate contact 97' on the support 76 and concentric with the contacts 78, 79 etc. thereon and adjacent the outer end of the second hand 72. The contact 97' is connected with the terminal 98 of the timing device, which in turn is connected with the terminal 96. The other terminal of the motor is connected with the terminal 101 of the source of energy through the reversing switch 38. When the films are deposited in the fixing bath, the circuit through the motor is broken, as previously described, by the operation of the mercury switch. By the arrangement shown, the circuit through the motor is not closed by the minute hand until the second hand completes the circuit through the contact 97, and since the second hand moves relatively fast the tendency to spark at the "make" is considerably reduced.

Figure 15:
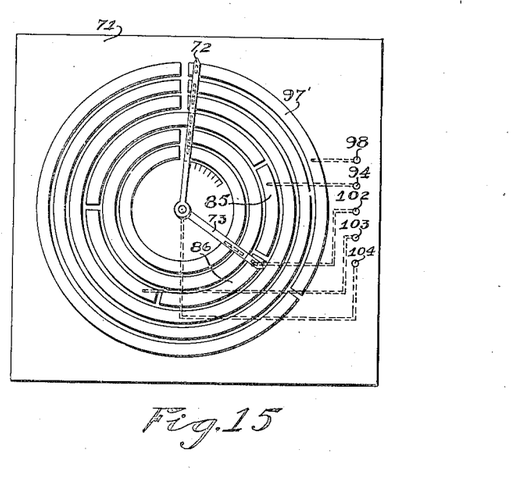
Fig. 15 is a view similar to Fig. 8 showing the timing device at the time when the films are transferred from the fixing to the final wash bath.
Figure 16:
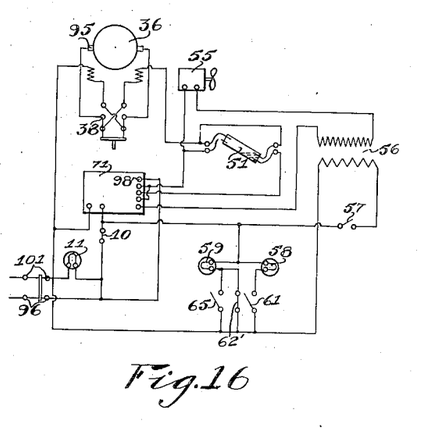
Fig. 16 is a view similar to Fig. 10 showing a position of the parts corresponding to the Fig. 15 position of the timing device.
Figure 17:
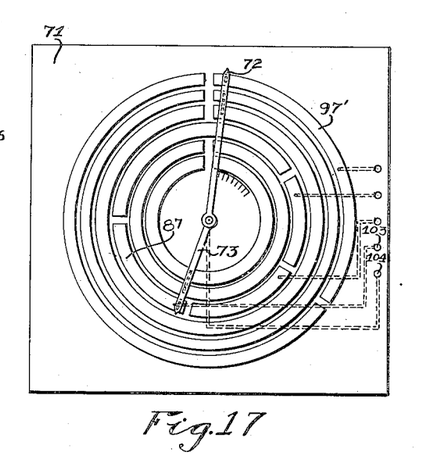
Fig. 17 is a view similar to Fig. 8 showing the timing device at the time when the final washing operation is complete and the drying is taking place.
Figure 18:
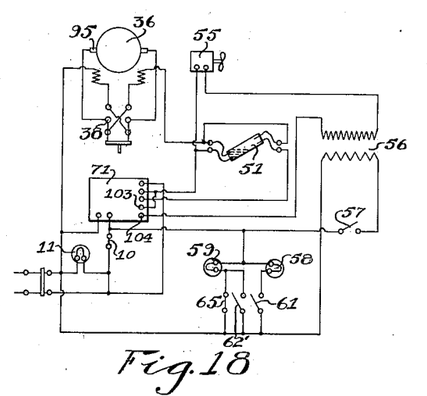
Fig. 18 is a view similar to Fig. 10 showing a position of the parts corresponding to the Fig. 17 position of the timing device.
Figure 19:
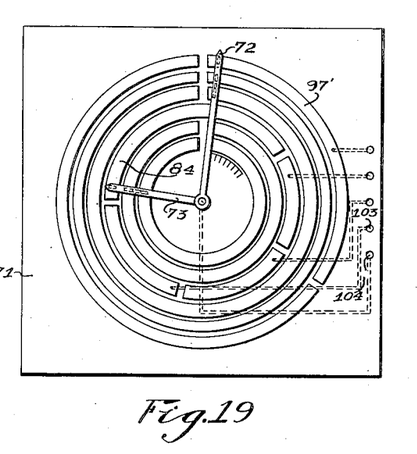
Fig. 19 is a view similar to Fig. 8 showing the timing device at the time after the drying is complete.
Figure 20:
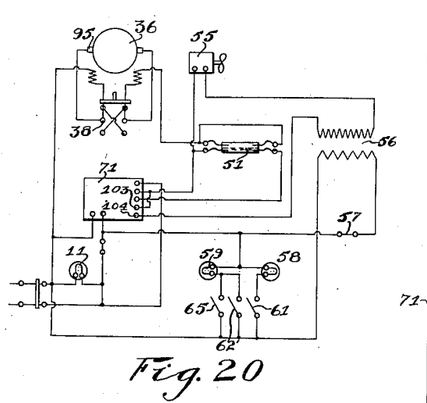
Fig. 20 is a view similar to Fig. 10 showing a position of the parts corresponding to the Fig. 19 position of the timing device.

The time interval allowed for the films in the fixing bath is usually about ten minutes, during which time the hands move from the Fig. 13 to the Fig. 15 position, and the contact 93 has moved from engagement with the contact 85, the length of which determines the time interval in the fixing bath, into engagement with the contact 86 and again closes the circuit through the other end of the mercury switch to the motor, to start the motor to move the carrier to transfer the films from the fixing bath to the wash bath, as previously described. The contact 86 is connected with the terminal 102 of the timing device which closes the circuit to one or the other of the terminals of the motor through the right hand end of the mercury switch, as seen in Fig. 16 of the drawings, the circuit from the terminal 96 being made as previously described through the second hand 72, and contact 97'. When the films have been deposited in the wash bath, the circuit through the motor is again broken by the operation of the mercury switch, as previously described.

The interval of time that elapses while the films are in the wash bath is determined by the length of the contact 86, usually ten minutes or longer. During the washing operation, the minute hand 73 moves from the position shown in Fig. 15 to that shown in Fig. 17 and carries its contact 93 from engagement with the contact 86 into engagement with the contact 87 to again close the circuit through the left hand end of the mercury switch and the reversing switch to one or the other of the terminals of the motor. This starts the motor to raise the films from the wash bath and move them over the drip tank when the motor is again stopped during the drying operation. The contact 87 is connected with the terminal 103 which in turn is connected with the terminal 94 and the circuits are closed as in the developing operation described above. During the drying operation, the switch 57 is closed, as described above, to close the circuit through the primary coil of the transformer to energize the secondary coil, causing a current to flow through the fan motor 55 by way of the terminal 104 of the timing device, minute hand 73 and terminal 94 of the timing device.

Figure 8:
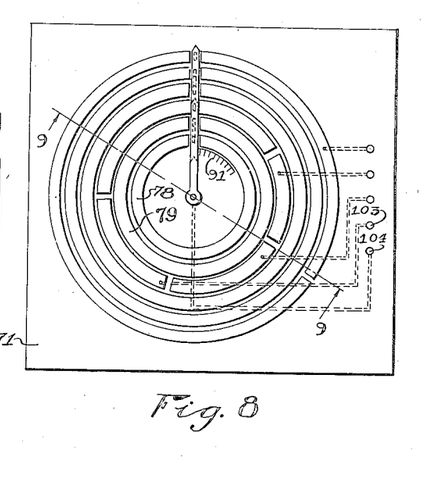
Fig. 8 is a plan view of the timing device, the contact arms being shown in the position they occupy when the apparatus is not in use, or when the clockwork is not in operation.

The minute hand continues to move on the contact 87 although the main motor 36 is stopped by the operation of the mercury switch. After the expiration of the predetermined time interval measured by the length of the contact 87, the minute hand moves from said contact and breaks the circuit between the contacts 104 and 94 and stops the fan motor. Continued operation of the timing device, however, takes place through the contacts 78, 79 and 83 until the minute hand 73 reaches the position shown in Fig. 8, when the contact 83 reaches the gap between the ends of the contacts 78 and 79. Means are provided, however, for continuing the operation of the timing device until the second hand reaches a position in substantial alinement therewith, as seen in Fig. 8. To this end, the gap between the ends of the contacts 78 and 79 is of greater angular width than the distance traversed by the minute hand in one second. Mounted on the support 76 is a pair of contacts 105 and 106 arranged in circuits of the conductors 82 and 81 and having gaps between their ends in radial alinement with the gaps between the ends of the contacts 78 and 79. A cooperating contact 107 is mounted on but insulated from the second hand 72 and arranged to cooperate with the contacts 105 and 106 to close the circuit between them. When the second hand is in the position shown in Fig. 8, its contact 107 is arranged between the ends of the contacts 105 and 106 and the circuit is broken. By this arrangement, unless the hands are in the position shown in Fig. 8 when the minute hand reaches said position, the circuit through the timing device is closed through the second hand and said device continues to operate for a time interval not more than one minute or until the second hand overtakes the minute hand at the gaps in the contacts 105 and 106 and breaks the circuit through the clockwork. When the clock is started, either the second or the minute hand may be moved forwardly by manual operation a distance sufficient to close the circuit through the clockwork. This is accomplished automatically when the minute hand is advanced to limit the developing operation to a time interval less than ten minutes.

Briefly, the operation is as follows: The exposed films are suspended from the arm 21 on the carrier 19 and the carrier is then moved to the position shown in Fig. 2 to insert the films in the developing bath and tilt the mercury switch to the position shown in Fig. 2 to close the circuit through its right hand end, as seen in said figure. If it is desired to develop the films for a time interval less than that represented by the length of the contact 84, the minute hand is adjusted, which also closes the circuit between the contacts 78 and 79. Closure of the switch 10 now completes the circuit through the clockwork which is set in operation. If for any reason it is desired to examine the films before development is complete, the switch 10 may be opened to stop the timing device while the films are removed from the developing bath and again closed to start the clock, which is of the self-starting type, when the films are reinserted therein, so that the total time that the films remain in the developing bath may be accurately measured.

When the developing operation is complete, the films are rinsed and deposited in the fixing bath as previously described, which fact is indicated to the attendant by extinguishing the red pilot lamp and causing the green pilot lamp to burn, so that if it is desired to examine the films in white light, as soon as this may be safely done the green light at once indicates that fact to the attendant. When the carrier finally moves to raise the film from the final wash bath for drying, the switch 57 which controls the circuit through the primary coil of the transformer is closed, and the mercury switch tilted to a substantially horizontal position to break the circuit through the motor. When the carrier is moved to its starting point to repeat the operation, the switch 57 is again opened by the operation of its spring and the mercury switch is released so that it may be tilted to operative position when the films are immersed in the developing bath.

Although the invention has been described with reference to a single embodiment thereof, it will be understood that this application is intended to cover such changes or modifications as come within the spirit of the invention or scope of the following claims.

I claim:

1. In a photographic developing apparatus, the combination with a casing, of developing, rinsing and fixing baths in said casing, a film carrier in said casing, means for mounting a film on said carrier, a reciprocating slide on which said carrier is pivoted, means for reciprocating said slide, means for moving the carrier on its pivot in a direction from the developing bath toward the fixing bath, guiding means for limiting the movement of the carrier to substantially vertical planes when the film is moved to and from the baths, and means cooperating with said guiding means for directing the carrier successively toward said baths when moved under the action of said moving means.

2. In a photographic developing apparatus, the combination of developing, rinsing and fixing baths, a film carrier, means for mounting a film on said carrier, a reciprocating slide on which said carrier is pivotally mounted, the slide being movable in one direction to raise the carrier to withdraw the film from one bath, means for moving the carrier relating to the reciprocating slide to position the film over the next succeeding bath for immersion therein when the slide is moved in the other direction, and means controlled by the movement of the slide for reversing its direction of movement.

3. In a photographic developing apparatus, the combination with a casing, of developing, rinsing and fixing baths in said casing, a film carrier in said casing, means for mounting a film on said carrier, an electric motor for moving said carrier to transfer the film to the fixing bath through the rinsing bath a normally open motor circuit, a timing device for closing the motor circuit when the film has been in the developing solution a predetermined interval of time, and means for breaking said circuit when the film has been transferred to the fixing bath.

4. In a photographic developing apparatus, the combination with a casing, of developing, rinsing and fixing baths in said casing, a film carrier in said casing, means for mounting a film on said carrier, a reciprocatory slide on which said carrier is pivotally mounted, said slide being movable in one direction to raise the film from the bath in which it is immersed and in the opposite direction to immerse the film in the next succeeding bath, the carrier being movable on the slide to position it over the different baths, and means for reversing the direction of movement of the slide when it reaches the l'mit of its movement in opposite directions.

5. In a photographic developing apparatus, the combination with a casing, of developing, fixing and washing baths in said casing, a film carrier in said casing, means for mounting a film on said carrier, an electric motor for moving the carrier to transfer the film from the developing to the fixing bath, a normally open motor circuit, means for breaking the circuit through the motor when the film has been deposited in the fixing bath, a timing device, means controlled by said timing device for closing the circuit after a film has been in the developing bath for a predetermined time, and means controlled by said timing device for closing said circuit after the film has been in the fixing bath for a predetermined interval of time to start the motor to move the carrier to transfer the film from the fixing bath to the washing bath.

6. In a photographic developing apparatus, the combination with a casing, of developing, rinsing, fixing and washing baths in said casing, a carrier in said casing, means for mounting a film on said carrier, an electric motor for moving the carrier to transfer the film from the developing bath through the rinsing bath and fixing bath to the washing bath, a normally open circuit for said motor, a timing device, means controlled by said timing device for closing the circuit and starting the motor when the film has been in the developing bath a predetermined interval of time, a switch for opening said circuit, means on the carrier for operating said switch to open the circuit and stop the motor when the carrier has been moved to transfer the film to the fixing bath, said timing device being again operative to close the circuit and start the motor when the film has been in the fixing bath a predetermined interval of time to transfer the film to the washing bath when said means on the carrier again operates said switch to open the circuit and stop the motor, again after a predetermined interval of time the timing device being operative to close the circuit and start the motor to move the carrier to withdraw the film from the washing bath when the means on the carrier again operates said switch to open the circuit and stop the motor, and means for drying the film.

7. In a photographic developing apparatus, the combination with a casing, of developing, rinsing, fixing and washing baths in said casing, a carrier in said casing, means for mounting a film on said carrier, an electric motor for moving the carrier to transfer the film from the developing bath through the rinsing bath and fixing bath to the washing bath, a normally open circuit for the motor, a timing device, means controlled by said timing device for closing said circuit and starting the motor when the film has been in the developing bath a predetermined interval of time, a switch for stopping the motor, means on the carrier for operating said switch to open the circuit and stop the motor when the carrier has been moved to transfer the film to the fixing bath, said timing device being again operative to close the circuit and start the motor when the film has been in the fixing bath a predetermined interval of time to transfer the film to the washing bath when said means on the carrier again operates said switch to open the circuit and stop the motor, again after a predetermined interval of time the timing device being operative to close said circuit and start the motor to move the carrier to withdraw the film from the washing bath when the means on the carrier again operates said switch to open the circuit and stop the motor, an electric fan for drying said film, and means on said carrier for starting the operation of said fan when the film is withdrawn from the washing bath.

8. In a photographic developing apparatus, the combination with a casing, of developing, rinsing, fixing and washing baths in said casing, a carrier in said casing, means for mounting a film on said carrier, an electric motor for moving the carrier to transfer the film from the developing bath through the rinsing bath and fixing bath to the washing bath, a normally open circuit for the motor, a timing device, means controlled by said timing device for closing the circuit and starting the motor when the film has been in the developing bath a predetermined interval of time, a switch for opening the circuit and stopping the motor, means on the carrier for operating said switch to open the circuit and stop the motor when the carrier has been moved to transfer the film to the fixing bath, said timing device being again operative to close the circuit and start the motor when the film has been in the fixing bath a predetermined interval of time to transfer the film to the washing bath when said means on the carrier again operates said switch to open the circuit and stop the motor, again after a predetermined interval of time the timing device being operative to close the circuit and start the motor to move the carrier to withdraw the film from the washing bath when the means on the carrier again operates said switch to open the circuit and stop the motor, an electric fan for drying said film when withdrawn from the washing bath, and means controlled by said timing device for stopping the operation of said fan when it has operated a predetermined interval of time.

9. In a photographic developing apparatus having developing, fixing and washing baths, of means for transferring a film from one of said baths to the next succeeding bath and raising it from the washing bath, an electric motor for operating said transferring means, means on said transferring means for successively breaking the circuit through said motor when the film has been transferred to the fixing and washing baths and raised from the latter, and means for successively closing the circuit through the motor after predetermined intervals of time, said means comprising a timing device having contacts corresponding to the fixing bath, washing bath and drying after the washing bath, and a contact driven at a predetermined rate of speed for successively engaging said contacts to start the motor at predetermined intervals of time to transfer the film from the developing bath to the fixing bath, from the fixing bath to the washing bath, and from the washing bath for drying.

10. In a photographic developing apparatus having developing. fixing and washing baths, of means for transferring a film from one of said baths to the next succeeding bath and raising it from the washing bath, an electric motor for operating said transferring means, means on said transferring means for successively breaking the circuit through said motor when the film has been transferred to the fixing and washing baths and raised from the latter, and means for successively closing the circuit through the motor after predetermined intervals of time, said means comprising a timing device having contacts corresponding to the fixing bath, washing bath and drying after the washing bath, a contact driven at a predetermined rate of speed for successively engaging said contacts to start the motor at predetermined intervals of time to transfer the film from the developing bath to the fixing bath, from the fixing bath to the washing bath, and from the washing bath, an electric fan for drying the film when moved from the washing bath, a switch operated by said transferring means when the film is moved from the washing bath for starting the electric fan, and means controlled by said timing device for breaking the circuit through said electric fan after a predetermined interval of time.

11. In a photographic developing apparatus, the combination with vertically reciprocating means, of a film carrier connected to said reciprocating means for vertical movement therewith and adapted to swing transversely thereof, means actuating the film carrier transversely in one direction, a series of vertical guides, a horizontal guide surmounting said vertical guides, and means on the carrier engageable with said guides whereby the vertical guides control the up-and-down movements of the carrier and the horizontal guide directs the film carrier successively into engagement with the several vertical guides.

12. In a photographic developing apparatus, the combination with vertically reciprocating means, of a film carrier pivotally mounted on said means for vertical movement therewith, means actuating the film carrier transversely in one direction, a series of vertical guides, a horizontal guide surmounting said vertical guides, means on the film carrier cooperating with said guides whereby the vertical guides control the up-and-down movements of the film carrier and the horizontal guide directs the film carrier successively into engagement with the several vertical guides, and a follower engageable with the film carrier and actuating it at all times toward said guides.

13. In a photographic developing apparatus, the combination with vertically reciprocating means, of a film carrier comprising a rod having its lower end pivoted to said reciprocating means, a series of vertical guides and a horizontal guide surmounting said vertical guides, and means between the ends of said rod engaging said guides whereby the vertical guides control the up-and-down movements of the film carrier and the horizontal guide directs the film carrier successively into engagement with the vertical guides.

14. In a photographic developing apparatus, the combination with vertically reciprocating means, of a film carrier connected to said reciprocating means for vertical movement therewith and adapted to swing transversely thereof, means actuating the film carrier transversely in one direction, a series of vertical guides, a horizontal guide surmounting said vertical guideways, said horizontal and vertical guides affording guideways between the vertical guides, and means on the carrier engageable with said guides and movable through said guideways successively into cooperation with the several vertical guides.

15. In a photographic developing apparatus, the combination with a horizontal support, of a series of bath tanks mounted on said support, the support having an opening therein in rear of the tanks, a film carrier extending through said opening in the support, a crossarm at the top of the film carrier having depending film-supporting means positionable successively in the different tanks, and devices located below said support for imparting movement to the film carrier.

16. In a photographic developing apparatus, the combination with a horizontal support, of a series of bath tanks mounted thereon, the support having an opening in rear of the tanks, a rod extending vertically through said opening, a crossarm at the upper end of said rod, film-supporting means depending from the crossarm and positionable successively in the tanks, vertically reciprocating means located below the support and having pivotal connection with the lower end of said rod, devices located below said support for imparting vertical movements to said means, a series of vertical guides and a surmounting horizontal guide disposed in rear of the tanks, and means on said rod engaging the aforesaid guides whereby the vertical guides control the up-and-down movements of the rod and the horizontal guide directs said rod successively to the different guides.

17. In a photographic developing apparatus, the combination with a support, of a series of bath tanks mounted on the support, the support having an opening in rear of the tanks, a vertically and transversely movable rod extending through said opening, a crossarm at the upper end of said rod, film-supporting means depending from said crossarm and positionable successively in the different tanks, vertically reciprocating means arranged below the support and pivotally connected with the lower end of said rod, a series of vertical guides and a surmounting horizontal guide in rear of the tanks, means on the rod cooperating with said guides, and a follower engageable with said rod and actuating it at all times toward said guides.

18. In a photographic developing apparatus, the combination with vertically reciprocating means, of a film carrier connected to said reciprocating means for vertical movement therewith and adapted to swing transversely thereof, means actuating the film carrier transversely in one direction, a series of vertical guides, a horizontal guide surmounting said vertical guides, means on the carrier engageable with said guides whereby the vertical guides control the up-and-down movements of the carrier and the horizontal guide directs the carrier successively into engagement with the several vertical guides, an electric motor operatively connected to said reciprocating means, a normally open circuit for said electric motor, and circuit opening means operable by the film carrier when it reaches its lowest point with reference to one of said vertical guides.

19. In a photographic developing apparatus, the combination with vertically reciprocating means, of a film carrier connected to said reciprocating means for vertical movement therewith and adapted to swing transversely thereof, means actuating the film carrier transversely in one direction, a series of vertical guides, a horizontal guide surmounting said vertical guides, means on the carrier engageable with said guides whereby the vertical guides control the up-and-down movements of the carrier and the horizontal guide directs the carrier successively into engagement with the several vertical guides, an electric motor operatively connected to said reciprocating means, a normally open circuit for said electric motor, and an oscillatory switch in said circuit located between two vertical guides in the path of the film carrier when it reaches its lowest point with reference to either of said vertical guides for automatically opening the circuit.

20. In a photographic developing apparatus, the combination with vertically reciprocating means, of a film carrier connected to said reciprocating means for vertical movement therewith and adapted to swing transversely thereof, means actuating the film carrier transversely in one direction, a series of vertical guides, a horizontal guide surmounting said vertical guides, means on the carrier engageable with said guides whereby the vertical guides control the up-and-down movements of the carrier and the horizontal guide directs the carrier successively into engagement with the several vertical guides, an electric motor operatively connected to said reciprocating means, a normally open circuit for said electric motor, a switch in said circuit located in the path of the film carrier when it reaches its lowest point with reference to one of said vertical guides for automatically opening the circuit, and a pivoted lever having one end cooperating with said switch to move it into circuit-closing position and its other end located in the path of the film carrier and engageable thereby when the latter is in its lowermost position with reference to another guide so as to move said switch to circuit-closing position.

21. In a photographic developing apparatus, the combination with a series of tanks for successively developing, rinsing, fixing and washing film, of vertically reciprocating means, a film carrier connected to the reciprocating means for vertical movement therewith and adapted to swing transversely thereof, means actuating the film carrier transversely in one direction, a series of vertical guides, a horizontal guide surmounting said vertical guides, means on the carrier engagement with said guides, an electric motor for actuating said reciprocating means, a normally open circuit for said motor whereby the mechanism is silent while the film is in the developing, fixing and washing baths, and a switch in said circuit and located for engagement by the film carrier when the latter reaches its lowermost position with reference to the guides corresponding to the fixing and washing baths for opening the circuit automatically when the film carrier reaches such positions.

22. In a photographic developing apparatus, the combination with a series of tanks for successively developing, rinsing, fixing and washing film, of vertically reciprocating means, a film carrier connected to the reciprocating means for vertical movement therewith and adapted to swing transversely thereof, means actuating the film carrier transversely in one direction, a series of vertical guides, a horizontal guide surmounting said vertical guides, means on the carrier engageable with said guides, an electric motor for actuating said reciprocating means, a normally open circuit for said motor whereby the mechanism is silent while the film is in the developing, fixing and washing baths, a switch in said circuit located for engagement by the film carrier when the latter reaches its lowermost position with reference to the guides corresponding to the fixing and washing baths for opening the circuit automatically when the film carrier reaches such positions, and means engageable by the film carrier for moving said switch to circuit-closing position when the film carrier reaches its lowermost position with reference to the vertical guide corresponding to the developing bath.

23. In a photographic developing apparatus, the combination with vertically reciprocating means, of a film carrier connected to said reciprocating means for vertical movement therewith and adapted to swing transversely thereof, means actuating the film carrier transversely in one direction, a series of vertical guides and a surmounting horizontal guide, means on the film carrier engageable with said guides, an electric motor for operating said reciprocating means, a normally open circuit for said electric motor, time controlled means for closing said circuit after predetermined intervals, and a switch located in the path of said film carrier for automatically opening the circuit when the film carrier reaches its lowermost position with reference to the vertical guides corresponding to the fixing and washing baths.

24. In a photographic developing apparatus, the combination of developing, rinsing, fixing, and washing baths, a film carrier, means for mounting a film on said carrier, an electric motor for operating said carrier, a normally open circuit for said motor, time controlled means for closing said circuit, and means on the carrier for opening the circuit and stopping operation of the motor when the film reaches the fixing bath.

25. In a photographic developing apparatus, the combination of developing, rinsing, fixing, and washing baths, a film carrier, means for mounting a film on said carrier, an electric motor for operating said carrier, a normally open circuit for said motor, time controlled means for closing said circuit, and means on the carrier for opening the circuit and stopping operation of the motor when the film reaches the fixing and washing baths respectively and after the film leaves the washing bath.

26. In a photographic developing apparatus, the combination of developing, rinsing, fixing, and washing baths, a film carrier, means for mounting a film on said carrier, an electric motor for operating said carrier, a normally open circuit for said motor, time controlled means for closing said circuit, a mercury switch controlling the operation of said motor, and means on the carrier for operating said switch and opening said circuit when the film reaches the fixing and washing baths respectively.

ARTHUR W. SMITH.